United States Patent [19]

Rittenbach

[11] 4,400,700
[45] Aug. 23, 1983

[54] DOPPLER FREQUENCY ANALYSIS OF RADAR SIGNALS

[75] Inventor: Otto E. Rittenbach, Neptune, N.J.

[73] Assignee: The United States of America as represented by the Secretary of the Army, Washington, D.C.

[21] Appl. No.: 271,725

[22] Filed: Jun. 8, 1981

[51] Int. Cl.³ .............................................. G01S 9/00
[52] U.S. Cl. .................................... 343/55 A; 343/7.7
[58] Field of Search ................. 329/122, 50, 153, 152; 331/25; 340/552, 554, 566; 343/55 A

[56] References Cited

U.S. PATENT DOCUMENTS

| | | | |
|---|---|---|---|
| 3,733,603 | 5/1973 | Johnston | 343/5.5 A |
| 3,794,771 | 2/1974 | Darboven et al. | 329/122 |
| 3,803,539 | 4/1974 | McMaster | 340/554 |
| 3,882,495 | 5/1975 | Bolger | 343/7.7 |
| 4,103,244 | 7/1978 | Tan | 329/122 |
| 4,106,019 | 8/1978 | Alexander | 343/9 |

Primary Examiner—Maynard R. Wilbur
Assistant Examiner—M. Gordon
Attorney, Agent, or Firm—Robert P. Gibson; Jeeremiah G. Murray; Edward Goldberg

[57] ABSTRACT

A Doppler radar is adapted to respond only to walking human targets by providing means to detect the frequency modulation of the Doppler signals caused by the oscillatory body movements of such walking targets. A frequency locked loop frequency modulation detector is provided for efficient detection of this so-called step frequency modulation, and the detected step frequencies are split into several bands representing targets walking at different step rates. Circuitry is shown for adapting this technique to continuous wave radars or range gated radars.

5 Claims, 5 Drawing Figures

DOPPLER FREQUENCY ANALYSIS OF RADAR SIGNALS

The invention described herein may be manufactured, used, and licensed by or for the Government for governmental purposes without the payment to me of any royalties thereon.

BACKGROUND OF THE INVENTION

This invention relates to Doppler radar, and more particularly to a method and apparatus for automatically classifying radar targets according to their distinctive target signatures. In the prior art, techniques for classifying such targets have involved splitting the Doppler frequency signals indicative of moving targets into two or more ranges corresponding to their radial velocities. This technique can discriminate between fast moving vehicles and men on foot, however it cannot distinguish between a man on foot and a slow moving vehicle with a radial velocity comparable to that of the moving human target.

For these reasons, discrimination between slow moving vehicles and men on foot has been accomplished by aural monitoring of battlefield Doppler signals. The present invention comprises a technique and circuitry which automatically provides this discrimination and thus is capable of utilizing equipment to perform a function which has hitherto required skilled military personnel. The technique involves sensing the distinctive step modulation of the Doppler echo signal of a moving human target. This step modulation comprises a frequency modulation of the Doppler signal of the moving man caused by body motion related to his step movements. It results from arm and leg movement as well as oscillatory torso movement due to the stepping movement. This so called step frequency is detected by means of a specially selected frequency modulation detector and circuitry is provided for splitting the step frequency signals into several bands corresponding to targets stepping at different speeds, for example, the lowest stepping frequency may correspond to a slowly walking man and the highest to a running man. The invention can be utilized with radars with or without range measuring capability.

SUMMARY OF THE INVENTION

In its simplest form the apparatus for carrying out this invention may comprise a coherent Doppler radar with no range measuring capability. The intermediate frequency of such a radar would be applied to an FM (frequency modulation) detector, preferably of the frequency lock loop type, which detects Doppler signals of all moving targets. The Doppler signals characteristic of the radial velocities of all types of targets including moving personnel and vehicles are used to produce a varying dc bias which constantly retunes the FM detector to the incoming Doppler signals. The step modulation frequency modulated onto the Doppler signals is detected and applied to a Fast Fourier Transformer or the functional equivalent thereof which may comprise merely a paralleled bank of stagger tuned filters covering the range of step frequencies. The filter outputs are detected preferably by means of integrating detectors and applied to indicators, which can be merely lamps.

The novel concept can be applied to a range gated coherent radar by selectively connecting the different range gate outputs by means of a multiplexing switch to an FM detector circuit which translates the Doppler frequency gate signals upward in frequency so that they can be efficiently frequency detected by means of a circuit resembling the frequency lock loop detector previously described. This embodiment also includes a bank of stagger tuned step frequency filters with detectors and a bank of indicators connected to the output of each filter via demultiplexing switches.

In a modification of this circuit, the range gate Doppler signals can be separately recorded as they are received and played back through the step frequency detection circuitry at a higher speed, so that no signals will be lost as the circuit processes signals from each range gate output in sequence.

These and other features and advantages of the invention will become apparent from the following detailed description and the drawings.

DETAILED DESCRIPTION OF A PREFERRED EMBODIMENT

Figure 1:
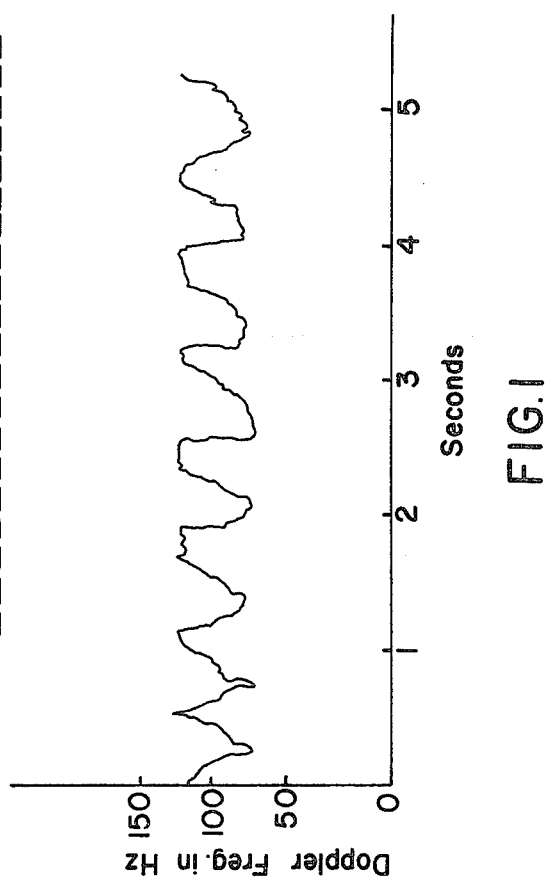
FIG. 1 is a waveform representing the Doppler signal of a walking human target.

The distinction between the Doppler signature of man and vehicles is readily apparent from listening to these signals. One can clearly distinguish the step modulation of a walking, running or even crawling man from the relatively constant or slowly changing tone of a vehicle, even though the radial velocity of each of these targets may be the same. FIG. 1 is a waveform of the Doppler signal of a walking man. This waveform shows the time variation of the Doppler energy from such a target. Most of the energy is seen to be concentrated around a Doppler frequency of about 100 Hz., this frequency representing the main body return of the target. This frequency is determined by the radial velocity of the target and the transmitter wavelength. The sinelike variation or modulation of the signal around the main body return, represents the step modulation due to the oscillatory body movements caused by walking or crawling. This step modulation is in part due to the back and forth motion of the targets' arms and legs, but is mainly due to the back and forth motion of the torso and shoulders because of the larger area of these parts of the body. It can be seen that the frequency of the waveform of FIG. 1 is approximately 2 Hz. This means that the target is taking approximately 2 steps per second. This frequency modulation of the Doppler signal is practically never seen in vehicular returns and it can be used for target classification purposes.

Figure 2:
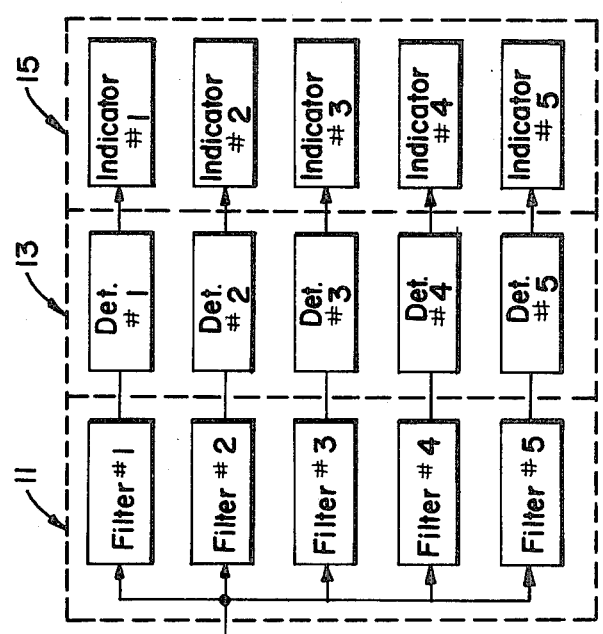
FIG. 2 shows a circuit diagram of the invention applied to a CW Doppler radar.

The block diagram of FIG. 2 shows a Doppler radar system which responds only to this step frequency modulation and thus will not respond to vehicular or other targets which do not exhibit this characteristic modulation. Further, the radar of FIG. 2 breaks the detected step frequencies down into different contiguous frequency bands characteristic of different step frequencies, with indicators for each such band. Thus the operators can estimate the step frequency by observing the indicators.

The radar system of FIG. 2 includes a coherent Doppler radar 7, which may be of the Continuous Wave (CW) type with no range measuring capability. The antenna 5 radiates the transmitter output and receives Doppler shifted echo signals. After coherent detection in radar 7, the intermediate frequency with the Doppler modulation thereon is applied to FM detector 9. The Doppler siganl at the output of radar 7 and at the input of FM detector 9 comprises the constant radar intermediate frequency, frequency modulated by target movement. In the case of a man walking at a constant speed, as explained above, this target movement results in a Doppler shift, frequency modulated at the step frequency, as illustrated in FIG. 1. The main body return, which produces the constant Doppler shift, is analogous to a subcarrier with the step frequency modulated thereon. The FM detector 9 detects this step frequency and applies it to a circuit 11, which may comprise merely a parallel bank of stagger tuned filters, labelled #1 through #5. The filters of circuit 11 are tuned to different frequencies covering the range of step frequencies. For example, filter #1 may be tuned about to 1 Hz which may correspond to the step frequency of a slowly walking man, filter #2 to 2 Hz representing a rapid walk, etc., with filter #5 representing a man running at a sprint. It should be noted that the step frequency, unlike the main body return, does not change as the target changes his angle to the line of sight of the radar beam. Thus a walking target which is traveling radially in or out along the beam or almost across the line of sight at the same speed will produce the same step frequency, even though the main body return will experience a change in frequency if such a change of direction occurs.

Each of the filters of circuit 11 have detectors connected thereto, labelled Det.#1 through #5 and collectively referred to as detector bank 13. These detectors may comprise a simple rectifier with a filter in the form of a capacitor connected thereto. Such a detector can integrate the ac signal applied thereto and this integration enhances the sensitivity of the device. If this added sensitivity is not needed or desired, the detector bank can be eliminated.

Each detector has an indicator attached thereto, labelled #1 through #5 and collectively referred to as indicator bank 15. The indicators may comprise any suitable device such as lamps.

Figure 3:
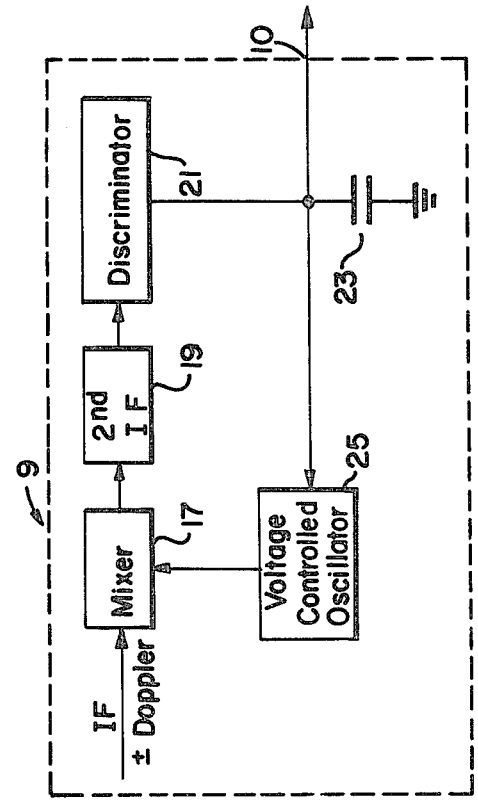
FIG. 3 shows a detailed diagram of the FM detector circuit of FIG. 2.

The input to FM detector 9 comprises the IF frequency, Doppler shifted by the main body return, with the step frequency modulating the frequency thereof. Thus if the intermediate frequency is 5.0 MHz for stationary targets and the radial velocity of a walking man target produces a Doppler shift of plus 100 Hz with a step frequency of 2 Hz, the signal applied to the FM detector will be a carrier frequency of 5.0001 MHz, frequency modualated at 2 Hz. If this same walking man target then changes his direction of motion relative to the radar beam so that his main body return yields a Doppler shift of minus 100 Hz with the same step frequency, the signal applied to the FM detector will be a carrier frequency of 4.9999 MHz, again modulated at 2 Hz. Thus the signal to be detected can be thought of as a frequency modulated carrier with the carrier varying in a more or less random manner. Such a signal can be efficiently detected by a detector of the frequency lock type wherein an automatic frequency control system will compensate for the varying carrier frequency, thus assuring that the step frequency modulation will be efficiently detected. Such a circuit is shown in FIG. 3. The incoming IF, plus or minus the Doppler shift, is applied to mixer 17 wherein it is heterodyned with the output of a voltage controlled oscillator (VCO) 25. One of the modulation products of this heterodyning is selected by second IF amplifier 19. For example, the VCO 25 may have a nominal frequency of 70% of the incoming IF and the second IF could be the difference frequency of 30% of the incoming IF. The output of the second IF amplifier 19 is applied to frequency discriminator 21 which may be a conventional circuit such as a Foster-Seeley discriminator with a center frequency equal to the center of the band of the second IF amplifier 19. Thus the center frequency of the discriminator would correspond to the signal frequency applied thereto from IF amplifier 19 resulting from a stationary target in the beam of the radar. The discriminator output will thus comprise voltages which vary with any frequency departure of the discriminator output caused by moving targets. The capacitor 23 on the discriminator output attenuates the higher frequency output thereof representing for example the main body return of a walking human target but is selected to pass to the filter bank 11 the step frequency modulation. The discriminator output is also fed back to VCO 25 to vary the frequency thereof in accordance with the discriminator output, in such a direction that the second intermediate frequency will tend to center on the center of the discriminator tuning. The result is a high sensitivity detector with a high signal to noise ratio.

Figure 4:
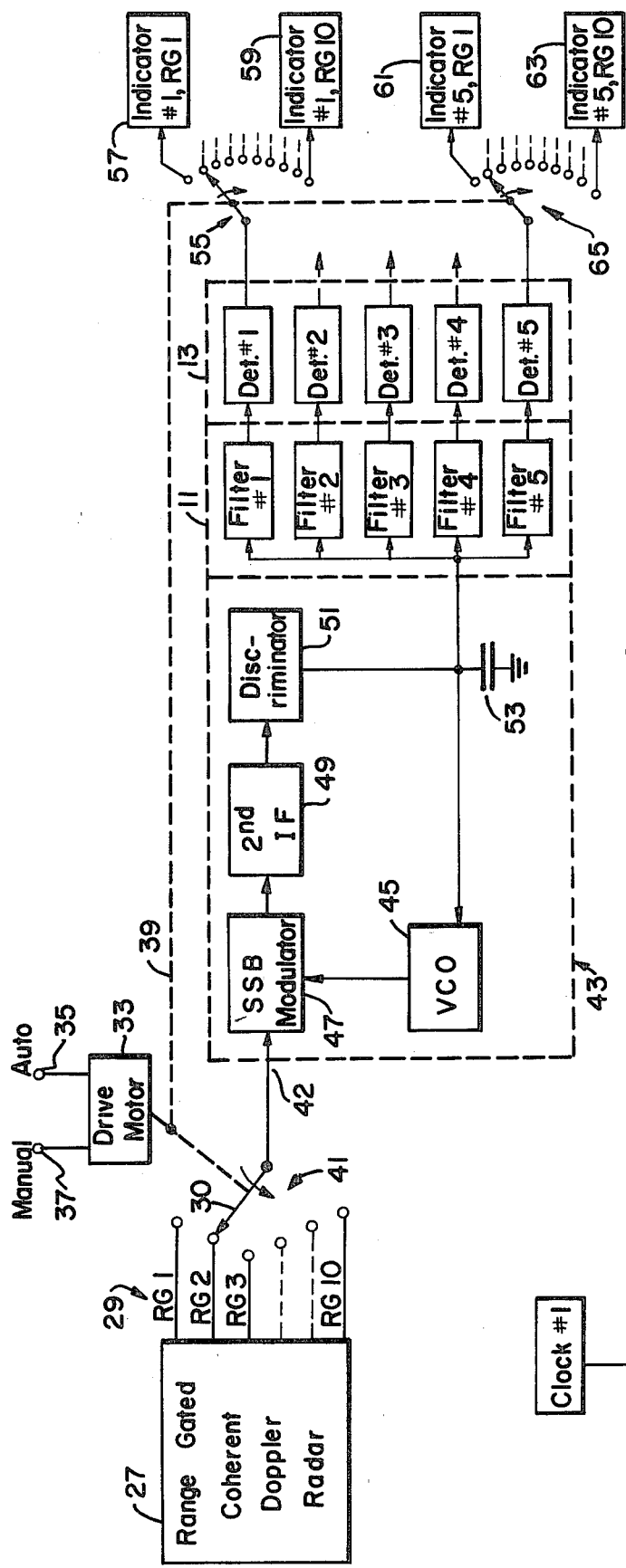
FIG. 4 shows how the concept can be applied to a range gated radar set.

The circuit of FIG. 4 shows how this concept can be applied to a range gated coherent radar. This radar includes an array 29 of 10 range gate outputs labelled RG1 through RG10. The signals at these outputs are baseband Doppler signals from targets at the ten different ranges. RG1 may represent targets out to 1000 meters, RG2 from 1000 to 2000 meters, etc. The circuitry includes an FM detector 43 in which the baseband Doppler signals from the radar 27 are modulated onto a carrier by means of a single sideband modulator, amplified and applied to a discriminator like that of FM detector 9 of FIG. 3. By heterodyning the baseband Doppler signals up in frequency, the size and weight of the discriminator is reduced. Further, the Doppler signals from the several range gates time share the FM detector 43. A filter bank 11 and detector bank 13 break down the step modulation signals into 5 channels representing different stepping frequencies, as in the circuit of FIG. 2. A demultiplexing means applies the detected step frequencies from each of the five channels to an array of indicators equal in number to the number of range gates. Thus a separate indicator is provided for each range gate at each step frequency.

The rotating switch 41 comprises a means to time division multiplex the range gate outputs of radar 27 so that they are sequentially applied to FM detector 43. The switch includes a circular array of contacts connected to different ones of the range gates, with the switch arm connectd to the input 42 of detector 43. The switch arm 30 is driven by drive motor 33 via mechanical connection 39. The motor may be continually rotated if control button 35 labelled 'auto' is pushed. If manual control button 37 is pushed the motor will step or jog the switch 41 to the next range gate and then stop. The circuitry of detector 43 includes single sideband modulator 47 to which the baseband Doppler signals are applied, as well as the output of voltage controlled oscillator 45. The second IF amplifier 49 amplifies the ssb signal from modulator 47 which will be the VCO frequency, single sideband modulated by the baseband Doppler signals. Since the frequency of VCO 45 is varying, the ssb modulator 47 must be of the type in which the unwanted sideband is eliminated by cancellation. The discriminator will have a center frequency near the center of the band of the IF amplifier which will equal the nominal VCO frequency plus the center or median frequency of the Doppler baseband. For example, if the nominal VCO frequency is 5.0 MHz and the Doppler frequencies range from 20 to 300 Hz, the discriminator would have a center frequency of 5.00016 MHz. As in the FM detector 9 of FIG. 3, the capacitor 53 filters out higher more or less constant Doppler frequencies but passes the step modulation to the subsequent circuitry. The filter bank 11 and detector bank 13 are identical in design and function to those of FIG. 2. The discriminator output is fed back to the VCO 45 for frequency control purposes, as in the detector of FIG. 3.

Each of the detector circuits of FIG. 4 has a plurality of indicators connected thereto equal to the number of range gates. The indicators representing a given one of the 5 channels are sequentially connected to the output of the detector of that channel through a demultiplexing switch synchronously operated with multiplexing switch 41 through the same drive motor, 33, and mechanical linkage 39. For example, the demultiplexing switch 55 has its rotor or arm connected to the output of detector #1, and a circular array of contacts equal in number to the number of range gates. A different indicator is connected to each of these contacts, two of which are shown in the drawing, indicators 57 and 59. Thus indicator 57 represents channel #1 or the lowest step frequency and it is connected to the switch contact representing range gate #1 or RG1. Thus when the multiplexing switch 41 is sampling RG1, the output of detector #1 will be applied to indicator 57, which denotes the lowest frequency step modulation within range gate #1. Similarly indicator 59 is connected to the switch terminal representing RG10 and indicates the lowest step frequency targets within this range gate. There are eight other indicators between indicators 57 and 59 representing range gates RG2 through RG9 but these are not shown.

Each of the detectors has a similar array of indicators connected to its output through a similar demultiplexing switch. Switch 65 is that for channel 5 and the first and last indicators, 61 and 63 representing range gates #1 and #10, respectively are shown. The multiplexing speed should be adjusted so that each range gate is connected to the subsequent circuitry for a period at least equal to the integration time of the detectors of detector bank 13. Otherwise the previously explained advantage of the use of integrating detectors would be lost.

The multiplexing and demultiplexing switches have been shown as rotating electro-mechanical switches driven by a motor, however purely electronic switches having no moving parts can be utilized here if the functional result is the same.

Figure 5:
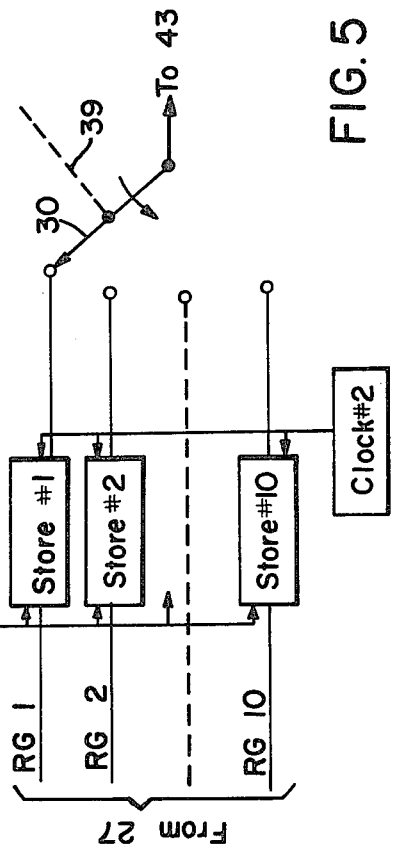
FIG. 5 shows how the circuit of FIG. 4 can be modified to eliminate loss of signals from other range gates while processing signals from one range gate.

The system of FIG. 4 has the disadvantage that briefly moving targets can be lost if the motion thereof occurs between samples of the range gate of the target. FIG. 5 shows how this can be avoided by adding circuitry. As shown in FIG. 5, a bank of Store circuits, #1 through #10, are inserted in range gate outputs of the radar 27. Clock #1 is a low frequency clock for clocking the baseband Doppler signals into the Store circuit of each range gate line. Clock #1 is connected to each of the store circuits and operates at real time to record the incoming Doppler signals in its store circuit. The clock #2 is a higher speed clock also connected to each store circuit. Clock #2 controls the reading out of the signals in the store circuits to the subsequent circuitry. The readout operation can be initiated by the contact of the multiplexer switch arm 30 with the output of the store circuit of each range gate. The high speed readout means that the Doppler signals are all translated up in frequency by a factor equal to the ratio of clock frequency #2 to that of clock #1. This can however be compensated for in the design of the subsequent circuitry. For example, with ten range gates a ten to one ratio of clock frequencies would be used and the tuning of the filters #1 through #5 would all be increased by a factor of ten. The indicators however would continue to indicate the same step frequencies as indicated in the embodiment of FIG. 4.

The storage of range gate signals and the high speed readout thereof means that practically none of the received Doppler signals will be lost.

The indicators may include a storage feature whereby they remain on for a fixed time, or until the next scanning of the demultiplexing switch. Also, the indicators can be arranged to stay on until manually reset.

While the invention has been described in connection with specific embodiments, obvious variations therein will be apparent to those skilled in the art. Accordingly, the invention should be limited only by the scope of the appended claims.

I claim:

1. A radar system which responds to distinctive Doppler step modulation resulting from the movement of human targets, comprising: a Doppler radar having a first intermediate frequency signal output modulated by a Doppler signal within a first low frequency range, a frequency modulation (FM) detector coupled to said radar to receive said first intermediate frequency and Doppler signal, said FM detector adapted to respond only to step frequency modulation on said first intermediate frequency, said step frequency being within a second range of low frequencies lower than said first frequency range and representing the frequency of movement of human targets, a plurality of parallel tuned filters operative within said second range of frequencies and connected to the output of said FM detector to split the detected step modulation frequencies into a number or contiguous frequency bands representing targets stepping at different rates, and a plurality of indicators respectively connected to the outputs of said filters to indicate the presence of moving targets at different step frequencies.

2. The system of claim 1 wherein said FM detector comprises a mixer providing a second intermediate frequency (IF) signal output, a voltage controlled oscillator (VCO), a second IF amplifier, a discriminator, and a low pass filter, said first intermediate frequency signal and the output of said VCO being applied to the input of said mixer, the input of said second IF amplifier being connected to the output of said mixer and the output of said amplifier being connected to the input of said discriminator, said low pass filter being connected to the output of said discriminator, the detector output being the voltage at the output of said low pass filter, said output voltage also being fed back to the input of said VCO.

3. A Doppler radar system which responds to the distinctive Doppler step modulation resulting from moving human targets, comprising: a coherent range gated Doppler radar with a plurality of baseband range gate intermediate frequency outputs modulated by a Doppler signal within a first low frequency range, a multiplexing switch, a frequency modulation detector connected to said range gates sequentially by said multiplexing switch to receive said intermediate frequency outputs and Doppler signal, said frequency modulation detector being adapted to respond only to step frequency modulation on said intermediate frequency, said step frequency being within a second range of low frequencies lower than said first frequency range and representing the frequency of movement of human targets, said frequency modulation detector comprising a single sideband modulator to which said baseband Doppler signals are applied as an input to be heterodyned up in frequency and provide a second intermediate frequency output, a voltage controlled oscillator connected to the second input of said single sideband modulator and a second intermediate amplifier connected to the output thereof, a discriminator connected to the output of said second intermediate frequency amplifier, a low pass filter connected to the output of said discriminator, the output of said low pass filter connected to the control input of said voltage controlled oscillator, a paralleled filter bank connected to said low pass filter output comprising an array of stagger tuned filters covering the second range of low step frequencies, integrating detectors connected respectively to each of the filters of said filter bank, an array of indicators connected to respective integrating detectors and equal to the number of range gates of said radar, demultiplexing switches connecting said indicators to said detectors and synchronously operated with said multiplexing switch.

4. The system of claim 3 further comprising store circuits in each of said range gate outputs, with two clock frequencies applied to each of said store circuits, the lower of said clock frequencies being adapted for recording and storing the range gate signals in said store circuits, and the higher frequency clock being adapted for playback of the stored signals to the subsequent circuitry when the storage circuit of a particular range gate is sampled by said multiplexer switch.

5. The system of claim 2 including a plurality of detectors connected respectively between each of said plurality of parallel tuned filters and associated indicators.

* * * * *